United States Patent [19]

McGee

[11] Patent Number: 4,614,875
[45] Date of Patent: Sep. 30, 1986

[54] VEHICLE ACTUATED, ROADWAY ELECTRICAL GENERATOR

[76] Inventor: Terrill A. McGee, 4536 College View, Los Angeles, Calif. 90041

[21] Appl. No.: 697,040

[22] Filed: Jan. 31, 1985

[51] Int. Cl.⁴ .............................................. F03G 3/00
[52] U.S. Cl. ................................... 290/1 R; 290/1 C
[58] Field of Search .................. 290/1 R, 1 C; 310/66

[56] References Cited

U.S. PATENT DOCUMENTS

| | | | |
|---|---|---|---|
| 4,239,975 | 12/1980 | Chiappetti | 290/1 R |
| 4,247,785 | 1/1981 | Apgar | 290/1 R |
| 4,409,489 | 10/1983 | Hayes | 290/1 R |
| 4,437,015 | 3/1984 | Rosenblum | 290/1 R |

Primary Examiner—William M. Shoop, Jr.
Assistant Examiner—W. E. Duncanson, Jr.
Attorney, Agent, or Firm—Donald Diamond

[57] ABSTRACT

The present invention transforms the vast amount of existent vehicular travel into an equally-vast alternative energy resource employable for the generation of electricity. This transformation is achieved by means of a novel system which generally includes a momentum-conversion assembly configured to convert available vehicle momentum into operational momentum for an associated momentum-referenced electricity generator. The conversion assembly is accordingly structured to be responsive to the passage along an associated roadway of vehicles having predeterminable roadway-traversal momentum, with a portion of this momentum then being that which is cooperatively applied to the generator. The resulting double utilization of associated energy resources for both vehicle motion and electricity generation constitutes an effective increase in resource conversion efficiency.

In a convenient specific embodiment, the generator is of the rotor-and-stator variety and the conversion assembly is companionably configured to convert a given vehicular-momentum portion into rotational momentum for the associated rotor. For an embodiment of this nature, the conversion may then be more-specifically achieved by the particular means of an externally-threaded spindle mechanized to axially reciprocate through a matingly-rotated yoke carried on the interior of the rotor. The reciprocations of the spindle, and hence the rotations of the rotor, are induced by overpassing vehicles encountering a spindle-end which is interceptingly disposed in the vehicle roadway.

The invention yet-more-specifically provides that the subject system may be realized in a modular form entailing a plurality of readily-replaceable and conveniently-transported foldable roadway sections.

11 Claims, 5 Drawing Figures

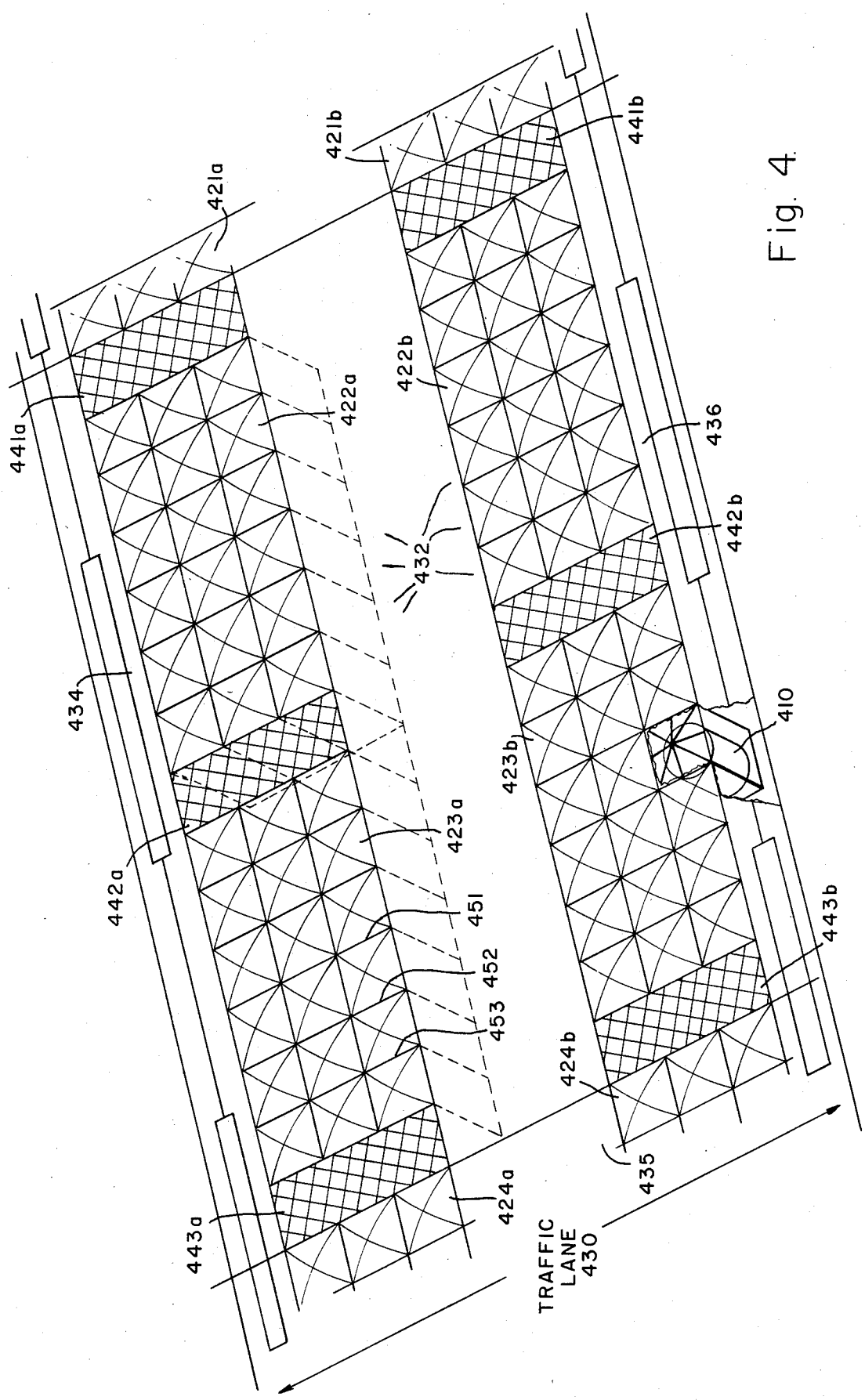

VEHICLE ACTUATED, ROADWAY ELECTRICAL GENERATOR

BACKGROUND OF THE INVENTION

1. Field of the Invention

The invention relates in general to systems for generating electricity and relates in particular to a system in which the motive power for such generators is derived from the momentum associated with vehicular travel along a roadway.

It is to be noted, however, that while the invention will be described with reference to particularized embodiments and end uses, the invention is not limited to such particularizations. Those having ordinary skill in the art and access to the teachings of this specification will recognize additional implementations and utilizations within the invention's scope.

2. Background Art

The resource-consumptive nature of typical energy conversion technologies, especially in conjunction with escalating resource costs and increased awareness of resource non-renewability, has urgently intensified the conservational significance and economic value of systems which offer either alternative conversion processes or increased conversion efficiencies. This is readily apparent in the area of electrical power generation where the enormous direct consumption of fossil fuels, or even their comparably-enormous indirect consumption in the production of nuclear fuels, has given rise to considerable experimentation with such alternative sources as solar energy, wind power and various geothermal phenomena.

These existing alternatives, however, suffer from a number of drawbacks. First, they are often dependent upon technologies of a costly, unproven or even exotic nature. Second, they are often available on only an isolated or even merely sporadic basis. Third, a considerable degree of logistical inconvenience can be entailed in their exploitation.

In contrast, the present invention simultaneously provides both a basic conversion alternative and an effective efficiency increase, and does so, moreover, through the use of essentially conventional technology, with respect to an energy resource which is widely available, and in a manner which is more manageable logistically than conventional power-generation systems.

SUMMARY OF THE INVENTION

The present invention transforms the vast amount of existent vehicular travel into an equally vast alternative energy resource employable for the generation of electricity. This transformation is achieved by means of a novel system which generally includes a momentum-conversion assembly configured to convert available vehicle momentum into operational momentum for an associated momentum-referenced electricity generator. The conversion assembly is accordingly structured to be responsive to the passage along an associated roadway of vehicles having predeterminable roadway-traversal momentum, with a portion of this momentum then being that which is cooperatively applied to the generator. The resulting double utilization of associated energy resources for both vehicle motion and electricity generation constitutes an effective increase in resource conversion efficiency.

In a convenient specific embodiment, the generator is of the rotor-and-stator variety and the conversion assembly is companionably configured to convert a given vehicular-momentum portion into rotational momentum for the associated rotor. For an embodiment of this nature, the conversion may then be more-specifically achieved by the particular means of an externally-threaded spindle mechanized to axially reciprocate through a matingly-rotated yoke carried on the interior of the rotor. The reciprocations of the spindle, and hence the rotations of the rotor, are induced by overpassing vehicles encountering a spindle-end which is interceptingly disposed in the vehicle roadway.

The invention yet-more-specifically provides that the subject system may be realized in a modular form entailing a plurality of readily-replaceable and conveniently-transported foldable roadway sections.

DESCRIPTION OF THE DRAWINGS

FIG. 4 is a composite embodiment which schematically illustrates the manner in which the subject generator modules may be clustered to form replaceable sections of a vehicle traffic lane.

DETAILED DESCRIPTION

I. Overview

Figure 1:
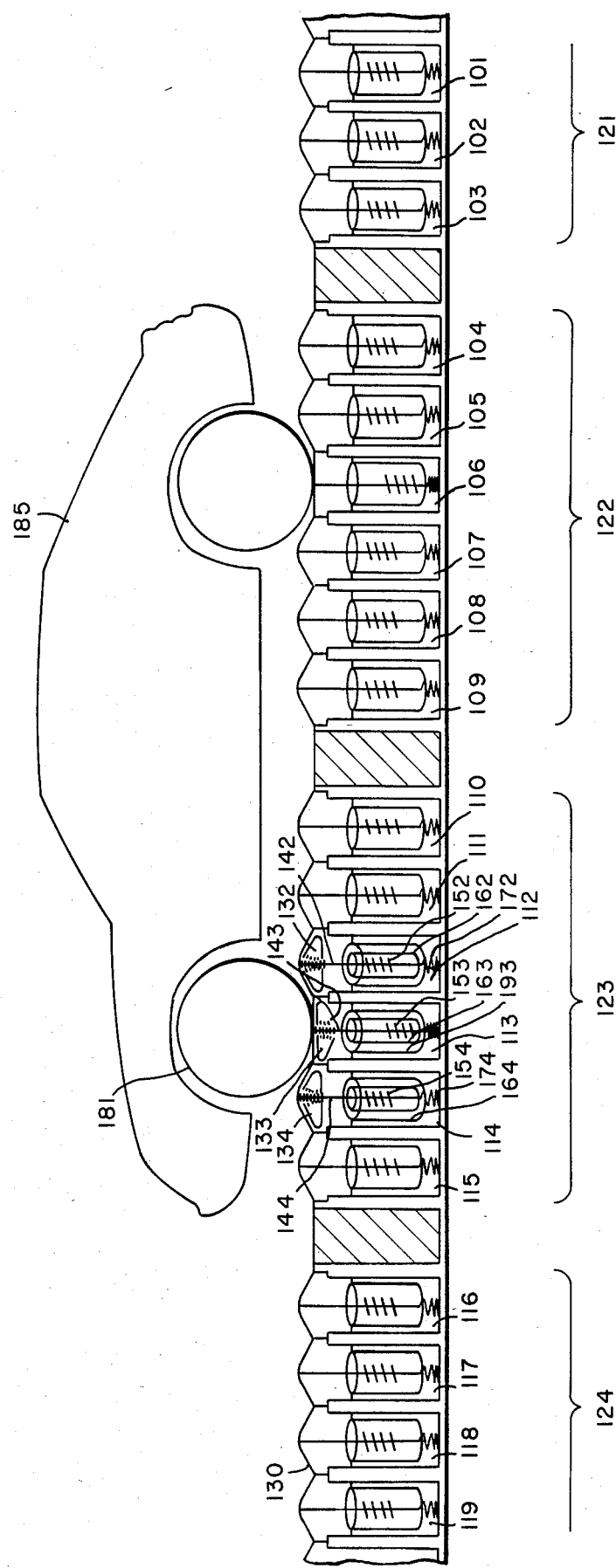
FIG. 1 schematically illustrates a modularized version of the invention in which the conversion from vehicular momentum to generator momentum is effectuated by means of roadway-intercepting, externally-threaded spindles whose vehicle-activated axial reciprocations induce the rotation of surrounding generator rotors within associated stators.

Included within the general scope of the claimed invention is the illustrative composite embodiment presented in FIG. 1 in which a plurality of generator modules 101 through 119 have been clustered to form successive sections 121 through 124 of a vehicle roadway 130. With specific regard to modules 112, 113 and 114, each module is seen to include a roadway-interface gear (132, 133 and 134) with which a central activation spindle (142, 143 and 144) is operatively associated. The respective spindles carry external threads 152, 153 and 154 which are adapted to cooperate with a subsequently-described yoke carried within surrounding rotors (162, 163 and 164). In the absence of an overpassing vehicle wheel, as with modules 112 and 114, the spindles and hence associated threads and interface gears are biased into an unactivated, raised-surface disposition by spring mechanisms 172 and 174. However, as with module 113, when gear 133 is encountered by a wheel 181 of a vehicle 185 which is traversing roadway 130, gear 133 and hence associated spindle 143 and threads 153 are depressed downward, thereby causing rotor 163 to rotate relative to surrounding stator 193. By means of suitable commutation and transmission devices not shown, the resulting generated electricity is made available to end users.

II. Implementation

Figure 2:
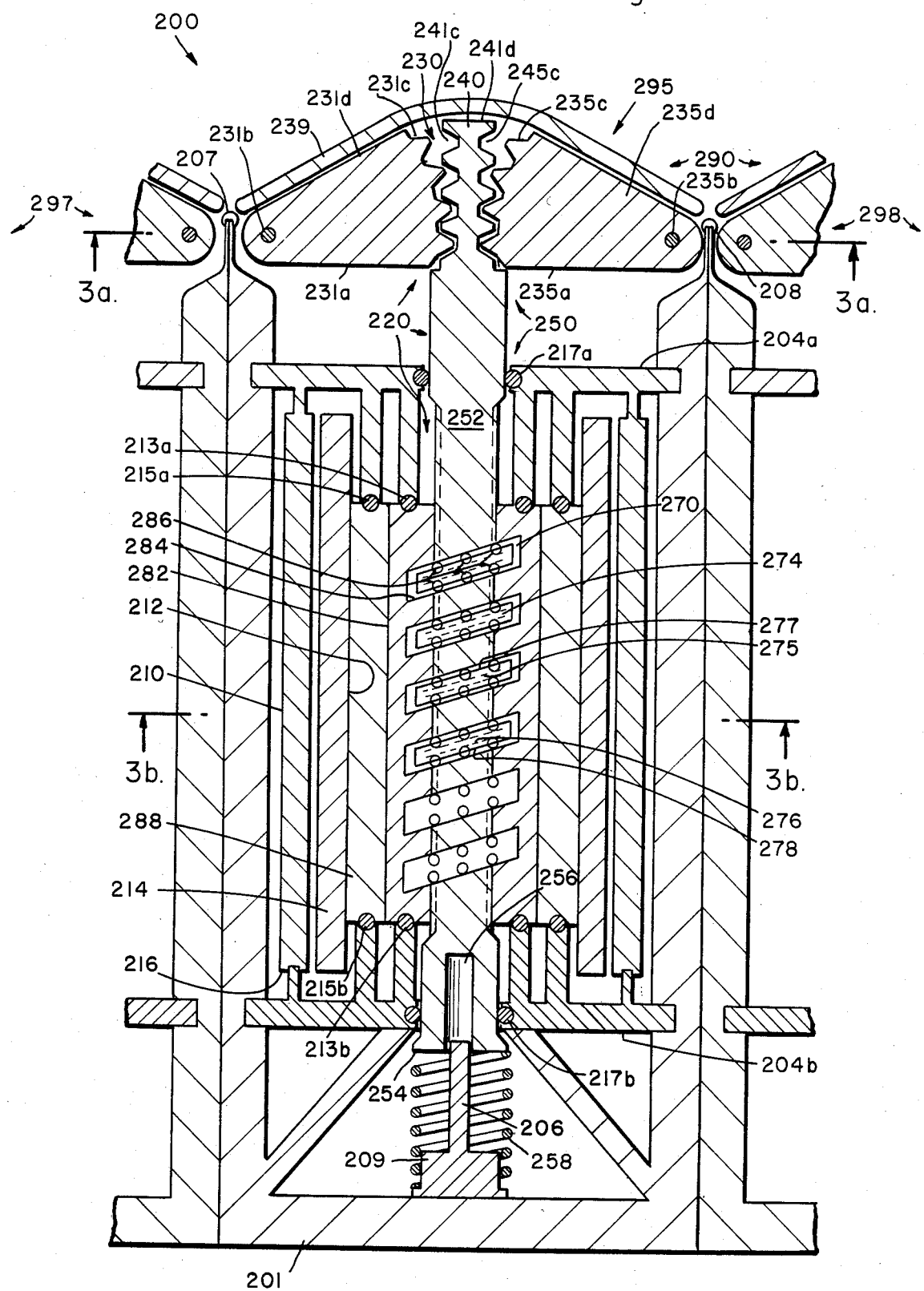
FIG. 2 is a longitudinal cross-section of a module which schematically illustrates the mechanization in which the downward depression of a surface-interface gear drives the spindle threads down through a matingly-threaded rotor yoke, thereby inducing rotor rotations.

In FIG. 2, elemental system 200 schmetically illustrates a manner in which certain basic aspects of the present invention may be mechanized. The system generally includes a momentum-referenced assembly 210 for generating electricity and a cooperating momentum-conversion assembly 220. Generator assembly 10 is "momentum-referenced" in that it is of a type whose generating effects are dependent upon a physical motion and hence physical momentum of one of its components. A rotor-and-stator generator, such as an AC alternator or a DC dynamo, is a conventional example of this class of generators and is conveniently employed in practice of the present invention. Conversion assembly 210, accordingly, more-specifically includes cylindrical rotor 214 and companion cylindrical stator 216.

The general purpose of conversion assembly 220 is to provide generator assembly 210 with the motive power which induces the motion of its momentum-referenced components. Assembly 220 achieves this purpose by being configured to convert a portion of the momentum inherent in the passage of vehicles along an associated roadway 290 into required operational momentum for the generator. In the described convenient case in which the generator is of the rotor-and-stator variety, conversion assembly 220 is then more-specifically configured to convert the subject vehicle-momentum portion into rotational momentum for the rotor of such a generator. It may be noted parenthetically that for any given operational situation, the general characteristics of the available vehicle momentum, and hence the generational characteristics and threshold motive-momentum requirements of associated generators, will usually be generally predeterminable.

With further specific regard to the FIG. 2 embodiment, assembly 220 is seen to be of the type which is configured for direct physical interface with roadway 290, where roadway 290 is in turn of the type which includes a vehicle-passage surface 295 adapted for contact traversal by wheeled vehicles. In such a context, conversion assembly 220 prefereably entails three subassemblies. The first subassembly 230 is disposed transversely and interecepts surface 295, with this transverse interception being in a manner which permits activational roll-over by the wheels of traversing vehicles. Operatively associated with subassembly 230 is second subassembly 250 which is configured for axially-reciprocating motion activated by the transversely-intercepting subassembly being encountered by subject vehicle wheels. The third subassembly 270 is configured to convert the axially-reciprocating motion of second subassembly 250 into the rotational motion of rotor 214.

In accordance with yet-more-specific aspects of the invention, axially-reciprocating subassembly 250 includes a spindle 252, with generator 210 then being disposed as illustrated such that rotor 214 coaxially surrounds a portion of this spindle. Furthermore, the reciprocation-to-rotation conversion subassembly 270 then includes both the spiral screw-thread ensemble 274 carried on the periphery of spindle 252, and yoke 282 carried on the spindle-surrounding interior 212 of rotor 214. By the particular means of internal spiral-thread ensemble 284 through which spindle-thread ensemble 274 is rotatably threaded, yoke 282 is adapted to be matingly rotated by the spindle's screw-thread ensemble. In an actual embodiment, the relative rotation of the respective thread ensembles may be facilitated by means of an interposed ball-bearing ensemble 286 whose individual spheres may be suitably mounted within yoke-thread ensemble 284 while being companionably guided within the spiral bearing channels 275 and 276 formed in the respective upper and lower surfaces 277 and 278 of spindle-thread ensemble 274.

In view of the bi-directional reciprocations of spindle 252, it will typically be advantageous to provide yoke 282 with an appropriate interface mechanism 288, such as suitable clutch or ratchet expedients not explicitly illustrated, which will enable yoke 282 to unidirectionally drive rotor 214 in reponse to the spindle's bi-directional reciprocations. It may be further noted in this regard that generator 210 will also typically include suitable bearing expedients for facilitating the continued rotation of rotor 214 once the rotor has received a unidirectional driving impulse from the spindle-and-yoke assembly. Such bearing expedients schematically appear both as paired bearing rings 213a and 213b, and as rings 215a and 215b. The various rings are schematically shown to be mounted on associated extensions 204a and 204b from casing 201. It may similarly be noted that the independence of rings 213a and 213b from rings 215a and 215b further contributes to enabling rotor 214 to continue its unidirectional rotations by virtue of also facilitating the independent counter-rotation of yoke 282 during the reciprocal upward return strokes of spindle 252. It may be conjunctively observed that during such upward strokes, upper tread surface 277 and its associated bearings will be the "active" elements which induce the yoke's return-clearance counter-rotations, while lower-tread surface 278 and its associated bearings will be active during the rotor-driving downward stroke.

Extensions 204a and 204b are also shown to be configured to provide lateral stabilization for spindle 252, with suitable bearing collars 217a and 217b likewise being employed to facilitate continued reciprocations through the surrounding stabilizing extensions. For the sake of further transverse stabilization, spindle-end 254 may also include guidance channel 256 adapted to receive stabilization probe 206. It may likewise be noted that extensions 204a and 204b may as shown be the means by which stator 216 is stationarily mounted within casing 201.

As additionally illustrated at spindle-end 254, axially reciprocating subassembly 250 may include a suitable spring mechanism 258 which is operatively associated with spindle 252 and which is configured to return the spindle and hence the surface-intercepting subassembly 230 to their unactivated positions after the passage of an activating vehicle wheel.

Although the suitable commutation and electricity-transmission devices typically associated with electrical generators are not explicitly shown in FIG. 2, the embodiment does schematically include suitable connective inter-module hinge mechanisms 207 and 208 by means of which system 200 may in conjunction with a composite modular configuration be mechanically joined to adjacent modules 297 and 298 in a manner which permits the several modules to be folded relative to each other. Such relative foldability will facilitate the transportability of various composite system realizations.

With regard again to intercept subassembly 230, the illustrated example is realized by means of a gear configuration which includes geared arms 231a and 235a respectively pivotable around axes 231b and 235b. Associated gear teeth 231c and 235c are adapted to interface with gear teeth 241c and 245c on spindle-end 240. Subassembly 230 is advantageously provided with a flexible vehicle-contact layer 239 which may be of suitable conventional composition and which may be disposed generally co-planar with said vehicle surface so as to form a generally continuous segment of said surface. For the sake of vertical stability for spindle 252, as well as for the sake of providing that traversal surface be level at the time of actual overpassage, spindle 252 and the various gear components are mutually configured such that when an overpassing wheel is disposed directly over spindle-end 240, arm surfaces 231d and 235d and spindle-end surface 241d will have been depressed downward into substantially-horizontally mutual alignment, with opposite spindle-end 254 coming to rest on vertical-support pedistal 209.

Figure 3A:
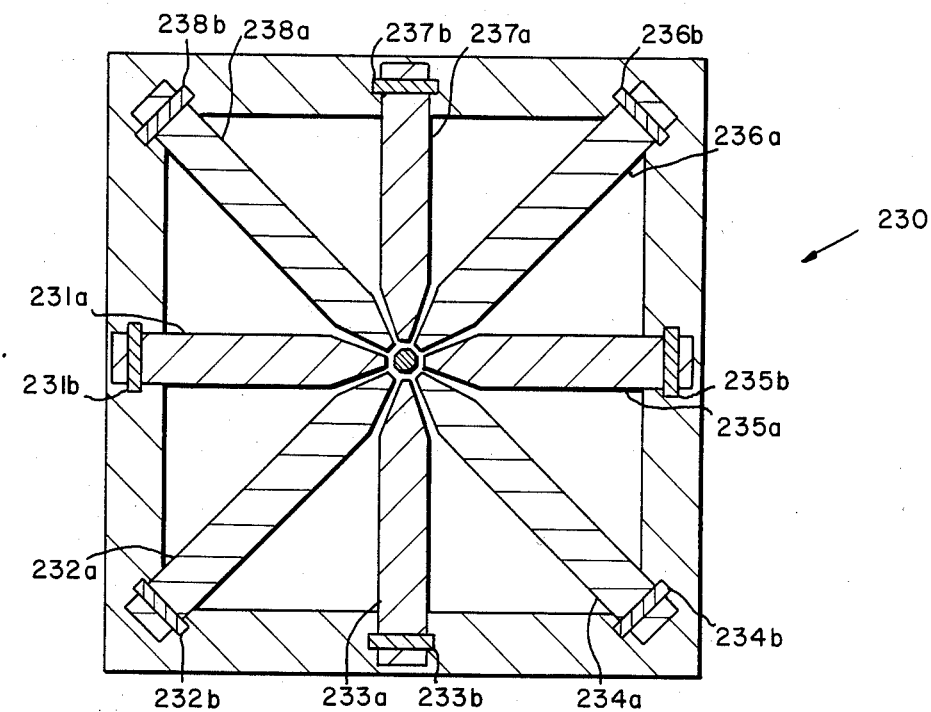
FIG. 3a is a horizontal cross-section taken along plane a—a of FIG. 2 and schematically illustrates the symmetrically-plural nature of the surface-interface gear.

Additional features of interface subassembly 230 are illustrated in FIG. 3a, which schematically represents a transverse cross-section through system 200 taken along plane a—a in FIG. 2. Subassembly 230 is shown as more-generally including the plurality of geared arms 231a through 238a which are symmetrically disposed surrounding spindle 252 so as to facilitate vehicle activation regardless of direction of incidence, as well as to facilitate multilateral gear activation and spindle stabilization in response to vehicle activation of any segment of the overall subassembly. Associated pivoting occurs with respect to likewise-associated pivot axes 231b through 238b suitably disposed within system casing 201.

Figure 3B:
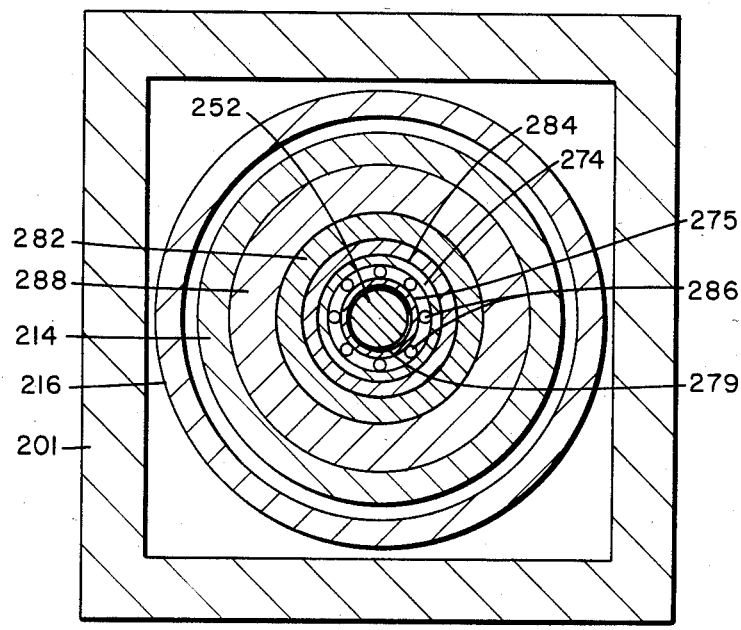
FIG. 3b is a cross-section taken along plane b—b of FIG. 2 and schematically illustrates the surrounding coaxial disposition of the mating yoke, rotor and stator with respect to the centralized spindle.

FIG. 3b schematically represents a projectional transverse cross-section through system 200 taken along plane b—b and further illustrates the relative relationships among various components previously described in conjunction with FIG. 2. Thus successively enclosed within system casing 201 are stator 216, rotor 214, unidirectional interface mechanism 288, yoke 282, yoke-thread 284, spindle thread 274, spindle-bearing channel 275, ball-bearing ensemble 286, spindle-to-yoke spacing 279 and finally spindle 252.

As indicated previously, the invention may be embodied in a modular form entailing a plurality of readily-replaceable and conveniently-transported foldable roadway sections. A modular embodiment of this nature is generally illustrated in FIG. 4, where the elemental system 200 of FIG. 2 may be employed as the basic embodiment module, and where an individual module 410 is specifically shown in schematic perspective. Although the various modules may be configured to be individually replaceable, they may as shown be clustered so as to form independent replaceable sections 421a through 424a and 421b through 424b of vehicle traffic lane 430, with the respective "a" and "b" section sequences being disposed so as to generally coincide with those portions of lane surface 435 which are most-frequently traversed by overpassing vehicles generally centered within lane 430. The respective sections are detachably interconnected by means of successive interface subsections 441a through 443a and 441b through 443b. By the additional means of the previously-described inter-module hinge mechanism, the sections may be folded upon themselves, for example along intrasection hinge lines 451, 452 and 453. It may be noted that although the respective "a" and "b" sequences are shown configured independently, both separated by interposed lane-center 432 and bounded by lane-edges 434 and 436, the composite configuration may also be such that the lane is hinged across its entire width. The corresponding portions of the respective sequences, together with the associated interposed and bounding lane segments, would than constitute portions of more-general sections which, while still independently interconnectable and transportable as described, would nevertheless span the entire traffic lane.

With regard once again to overall invention fundamentals, and as will be further emphasized below, other example alternatives may also be noted. As an elementary preliminary matter, it will be apparent that although the above-described embodiments have been illustrated in general accordance with a scale which assumes the subject modules are approximately 5" by 5" by 21" (level activated), such dimensions are exemplary only and other, often preferably smaller realizations are, of course, possible. In addition, the interface between subject vehicles and subject generators may be carried out in manners other than those described. Other types of roadway-interface gearing may be employed, including those in which spindle 252 and hence the associated rotor axis were disposed parallel to the roadway instead of transverse as previously shown. There need not even be a direct mechanical interface with the roadway surface as a magnetic interface, in which appropriate magnetic elements mounted on a roadway-juxtaposed spindle end, may also be employed to induce spindle rotation in response to the momentum of passing vehicles. It is thus apparent that the described contact transversal is not generically necessary, with overpassage by vehicles otherwise suspended above the vehicle surface, as for example by magnetic levitation, also being a source of motive generator power. It is conjunctively apparent that although the surface-intercepting assembly 230 and the spindle-and-generator assembly have been shown in the preferred embodiment to be mutually configured such that the generator is disposed on the side of the vehicle surface which is opposite from that along which vehicles transverse, alternative gearing and even magnetic-activation configurations also make possible dispositions above or to the side of the vehicle surface. The invention further encompasses vehicles and roadways other than those of the automobile variety, and may apply to any number of vehicle systems, such as trains, which move along predetermined paths. It is in this context of alternative vehicle types that it may be supplementally noted that a roadway which has been configured according to the present invention may also be provided with electrical expedients, such as extended contact strips, which would enable electric-powered vehicles to tap off a portion of inventively-generated electricity for their own propulsion during travel.

III. Relationship to Claimed Subject Matter

The preceding description has presented in detail exemplary preferred ways in which the concepts of the present invention may be applied. Those skilled in the art will recognize that numerous alternatives encompassing many variations may readily be employed without departing from the spirit and scope of the invention as set forth in the appended claims.

That which is claimed is:

1. A system for generating electricity in cooperation with a roadway having a vehicle-passage surface adapted for contact traversal by wheeled vehicles, this system comprising:
    (a) means transversely and interceptingly disposed in said vehicle-passage surface in a manner which permits activational rollover by the wheels of traversing vehicles;
    (b) a spindle operatively associated with said transverse-intercept means and configured for axially-reciprocating motion activated upon said intercept means being encountered by said traversing wheels; and
    (c) rotor-and-stator means for generating electricity, said generator being disposed with its rotor coaxially surrounding a portion of said reciprocable spindle; with
    (d) said spindle having screw-thread means carried on its periphery; and with
    (e) said rotor having yoke means carried on its spindle-surrounding interior, said yoke means being adapted to be matingly rotated by said screw-thread means when said spindle is axially reciprocated through said yoke.

2. A system according to claim 1 in which:
said yoke means includes means for unidirectionally driving said rotor in response to the bi-directional reciprocations of said spindle.

3. A system according to the claim 2 in which:
said generator includes bearing means for facilitating the continued rotation of said rotor once said rotor has received a unidirectional driving impulse from said spindle-and-yoke assembly.

4. A system according to claim 1 further including:
spring means, operatively associated with said spindle, for returning said spindle and the associated surface-intercepting means to their unactivated positions after the passage of an activating vehicle wheel.

5. A system according to claim 4 in which:
said surface-intercepting means and the spindle-and-generator assembly are mutually configured such that said assembly is disposed on the side of said vehicle surface which is opposite from the side along which vehicles traverse.

6. A system according to claim 1 in which:
said surface-intercepting means includes a flexible vehicle-contact layer disposed generally co-planar with said vehicle surface so as to form a generally continuous segment of said surface.

7. A system according to claim 1 in which:
said generator comprises an AC alternator.

8. A system according to claim 1 in which:
said generator comprises a DC dynamo.

9. A system for generating electricty comprising:
    (a) a plurality of generator modules which in operational ensemble form a portion of a vehicular roadway having a vehicle-passage surface adapted for contact traversal by wheeled vehicles; each of said modules including:
    (b) means, transversely disposed with respect to the vehicular roadway, for intercepting the vehicle passage surface in a manner which permits activational roll-over by the wheels of traversing vehicles;
    (c) a spindle which with respect to said vehicle-passage surface is transversely juxtaposed on the surface side which is opposite from the side along which vehicles traverse:
        (1) said spindle being both operatively associated with said transverse-intercepting means and configured for axially-reciprocating motion and activated by the wheels of traversing vehicles; and
        (2) said spindle having spiral screw-thread means carried on said spindle's axial periphery;
    (d) spring means for returning said spindle and the associated surface-intercepting means to their unactivated positions after the passage of an activating vehicle wheel;
    (e) rotor-and-stator means for generating electricity, said generating means being disposed with its rotor coaxially aurrounding a portion of said spindle, said rotor carrying yoke means on its spindle-surrounding interior; and
    (f) said yoke means being adapted to be matingly rotated by said screw-thread means when said spindle is axially reciprocated through said yoke, said yoke including means for unidirectionally driving said rotor in response to the bi-directional reciprocations of said spindle.

10. A system according to claim 9 further including:
inter-module connection means for mechanically joining said modules in a manner which enables said modules to be folded relative to each other, thereby facilitating system transportability.

11. A system according to claim 9 further comprising:
a plurality of detachably-interconnectable, independently-transportable roadway sections, each of said sections in turn comprising a plurality of said generator modules.

* * * * *